United States Patent
Liu et al.

(10) Patent No.: US 9,538,161 B2
(45) Date of Patent: Jan. 3, 2017

(54) SYSTEM AND METHOD FOR STEREOSCOPIC PHOTOGRAPHY

(71) Applicant: LIPS INCORPORATION, Taipei (TW)

(72) Inventors: Ling-Wei Liu, Taipei (TW); Hung-Chang Tsai, Taipei (TW)

(73) Assignee: LIPS CORPORATION, Taipei (TW)

( * ) Notice: Subject to any disclaimer, the term of this patent is extended or adjusted under 35 U.S.C. 154(b) by 239 days.

(21) Appl. No.: 14/496,239

(22) Filed: Sep. 25, 2014

(65) Prior Publication Data

US 2015/0271472 A1 Sep. 24, 2015

(30) Foreign Application Priority Data

Mar. 24, 2014 (TW) .............................. 103110908 A

(51) Int. Cl.
*H04N 13/00* (2006.01)
*H04N 13/02* (2006.01)
*G03B 35/08* (2006.01)

(52) U.S. Cl.
CPC .......... *H04N 13/0239* (2013.01); *G03B 35/08* (2013.01); *H04N 13/0007* (2013.01); *H04N 13/0246* (2013.01); *H04N 13/0296* (2013.01); *H04N 2013/0081* (2013.01)

(58) Field of Classification Search
None
See application file for complete search history.

(56) References Cited

U.S. PATENT DOCUMENTS

| | | | | |
|---|---|---|---|---|
| 7,092,015 | B1* | 8/2006 | Sogawa | G01C 3/08 348/222.1 |
| 2010/0097444 | A1* | 4/2010 | Lablans | G03B 35/00 348/46 |
| 2011/0050853 | A1* | 3/2011 | Zhang | H04N 13/026 348/44 |
| 2012/0026297 | A1* | 2/2012 | Sato | G03B 35/08 348/47 |
| 2012/0147205 | A1* | 6/2012 | Lelescu | H04N 13/0029 348/218.1 |
| 2013/0010073 | A1* | 1/2013 | Do | H04N 13/0214 348/46 |
| 2015/0145965 | A1* | 5/2015 | Livyatan | B60R 1/00 348/47 |
| 2015/0199018 | A1* | 7/2015 | Kim | G06F 3/017 345/156 |

(Continued)

*Primary Examiner* — Reza Aghevli
(74) *Attorney, Agent, or Firm* — Huffman Law Group, PC

(57) ABSTRACT

A stereoscopic photography is provided, which includes a first image sensor, a second image sensor, a synchronization module, a combination module, a calibration module, and a stereo matching module. The first image sensor is utilized to capture a first image. The second image sensor is utilized to capture a second image. The calibration module is utilized to perform an image calibration and a horizontal rectification for the first image and the second image. The stereo matching module is utilized to calculate a distance difference between a reference pixel of the first image and a corresponding pixel of the second image. The stereo matching module compares costs of multiple pixels relative to the reference pixel in a pixel row of the second image in an interval manner. A method for performing stereoscopic photography and a stereo matching method are also provided.

16 Claims, 7 Drawing Sheets

(56) References Cited

U.S. PATENT DOCUMENTS

2015/0199588 A1\* 7/2015 Kim ................ G06T 7/0075
382/154
2015/0304634 A1\* 10/2015 Karvounis ........ H04N 13/0239
348/46

\* cited by examiner

US 9,538,161 B2

SYSTEM AND METHOD FOR STEREOSCOPIC PHOTOGRAPHY

CROSS-REFERENCE TO RELATED APPLICATIONS

This application claims priority from Taiwan Patent Application No. 103110908, filed in the Taiwan Patent Office on Mar. 24, 2014, entitled "SYSTEM AND METHOD FOR STEREOSCOPIC PHOTOGRAPHY," and incorporates the Taiwan patent application in its entirety by reference.

TECHNICAL FIELD OF THE INVENTION

The present invention relates to a stereoscopic photography system and a method thereof, and in particular to a stereoscopic photography system and a method which are capable of reducing the amount of computation.

BACKGROUND OF THE INVENTION

In recent years, with the development of three-dimensional (3D) display technology, processing of stereoscopic images has been increasingly important. In general, the stereoscopic images can be formed in the following ways: for example, using a depth camera that can obtain depth information to photograph, or using dual cameras which can simulate human binocular vision to photograph, and then performing an appropriate image processing for two-dimensional (2D) images to obtain the stereoscopic images.

Stereoscopic image herein means that the objects in the image have different visual depths in addition to the usual two-dimensional images. The technique of converting the 2D images into the stereoscopic images is called stereo matching. Stereo matching means a process of photographing two or more images of a certain scene, estimating a 3D model of the scene by accurately finding matching pixels between the images, and converting 2D positions of the matching pixels into 3D depths.

In the computing technique of conventional stereo matching, one of the two images which are respectively captured by two cameras usually serves as a reference image, and the other serves as a target image. Then, a disparity map of the target image relative to the reference image is output. The disparity of each pixel is inversely proportional to the distance of a photographed object. Therefore, the disparity map can be utilized to depict the 3D depths of the captured image.

However, each of the pixels in the reference image is required to calculate the disparity thereof, and the algorithm of the conventional stereo matching is very complicated, so there is a great amount of computation. Thus, under the restriction of the current semiconductor technology, the stereoscopic photography techniques using a dual camera are still in a developmental stage, it is difficult to reach a commercialization stage.

SUMMARY OF THE INVENTION

Accordingly, an objective of the present invention is to provide a stereoscopic photography system which provides a specified structure to achieve stereoscopic photography and is able to reduce the amount of computations needed for stereo matching, so that the stereoscopic photography system can be commercialized.

Another objective of the present invention is to provide a method for performing stereoscopic photography which employs an interval manner to calculate the disparities for reducing the amount of the computation, thereby solving the problem of the current semiconductor restriction.

Yet another objective of the present invention is to provide a stereo matching method for the stereoscopic photography system, which employs an interval manner to calculate the disparities for reducing the amount of computations, thereby realizing commercialization.

To achieve the foregoing objectives, according to an aspect of the present invention, the stereoscopic photography system provided in the present invention includes a first image sensor, a second image sensor, a synchronization module, a combination module, a calibration module, and a stereo matching module. The first image sensor is utilized to capture a first image for generating a first data stream. The second image sensor is disposed apart from the first image sensor by a horizontal distance and is utilized to capture a second image for generating a second data stream. The synchronization module is electrically coupled to the first image sensor and the second image sensor and is utilized to synchronize the first data stream and the second data stream and utilized to synchronize auto-exposure and auto-white balance parameters of the first image sensor and the second image sensor. The combination module is utilized to combine the first data stream and the second data stream for outputting a combined image data. The combined image data includes the first image and the second image. The calibration module is utilized to perform an image calibration and a horizontal rectification for the first image and the second image in the combined image data. The stereo matching module is utilized to calculate a distance difference between a reference pixel of the first image and a corresponding pixel of the second image. The stereo matching module compares costs of a plurality of pixels relative to the reference pixel in a pixel row of the second image in an interval manner.

In one preferred embodiment, the interval manner is an interval of a predetermined number of pixels. Specifically, the predetermined number is a positive integer.

In one preferred embodiment, the costs are brightness differences.

In one preferred embodiment, the stereo matching module further includes a sub-pixel interpolation unit which is utilized to accurately compute the distance differences, so that an error of the distance differences is less than 0.1 pixels.

In one preferred embodiment, the pixels are positioned in a search interval of the pixel row.

In one preferred embodiment, the synchronization module provides a clock controlling signal for the first image sensor and the second image sensor. Moreover, the first data stream and the second data stream have synchronized data line signals.

In one preferred embodiment, the stereo matching module is implemented by software, hardware, firmware, or a combination thereof.

To achieve the foregoing objectives, according to another aspect of the present invention, the method for performing stereoscopic photography provided in the present invention includes the steps of: capturing a first image and a second image respectively by a first image sensor and a second image sensor for generating a first data stream and a second data stream; synchronizing the first data stream and the second data stream, and synchronizing auto-exposure and auto-white balance parameters of the first image sensor and the second image sensor; combining the first data stream and the second data stream for outputting a combined image data which comprises the first image and the second image; performing an image calibration and a horizontal rectification for the first image and the second image in the combined image data; and calculating a distance difference between a reference pixel of the first image and a corresponding pixel of the second image, wherein calculating the distance difference further comprises the step of comparing costs of a plurality of pixels relative to the reference pixel in a pixel row of the second image in an interval manner.

In one preferred embodiment, the interval manner is an interval of a predetermined number of pixels. Specifically, the predetermined number is a positive integer.

In one preferred embodiment, the costs are brightness differences.

In one preferred embodiment, calculating the distance difference further includes the step of performing a sub-pixel interpolation for accurately computing the distance difference, so that an error of the distance differences is less than 0.1 pixels.

In one preferred embodiment, the pixels are positioned in a search interval of the pixel row.

In one preferred embodiment, the step of calculating the distance difference is implemented by software, hardware, firmware, or a combination thereof.

To achieve the foregoing objectives, according to yet another aspect of the present invention, the present invention provides a stereo matching method for the stereoscopic photography system. The stereoscopic photography system includes a first image sensor for capturing a first image and a second image sensor for capturing a second image. The method includes: calculating a distance difference between a reference pixel of the first image and a corresponding pixel of the second image, wherein calculating the distance difference further comprises the step of comparing costs of a plurality of pixels relative to the reference pixel in a pixel row of the second image in an interval manner.

In one preferred embodiment, the interval manner is an interval of a predetermined number of pixels, and the predetermined number is a positive integer.

In comparison with the prior art, the stereo matching module employed in the present invention not only reduces the amount of disparity computations in the interval manner, but also improves the accuracy of calculating the 3D depths by means of sub-pixel interpolation. That is to say, the stereoscopic photography system and method of the present invention not only reduce the amount of computations by the interval manner, but also improves the accuracy of the 3D depths due to sub-pixel interpolation.

It is to be understood that both the foregoing general description and the following detailed description of the present invention are exemplary and explanatory and are intended to provide further explanation of the invention as claimed.

DETAILED DESCRIPTION OF THE INVENTION

Figure 1:
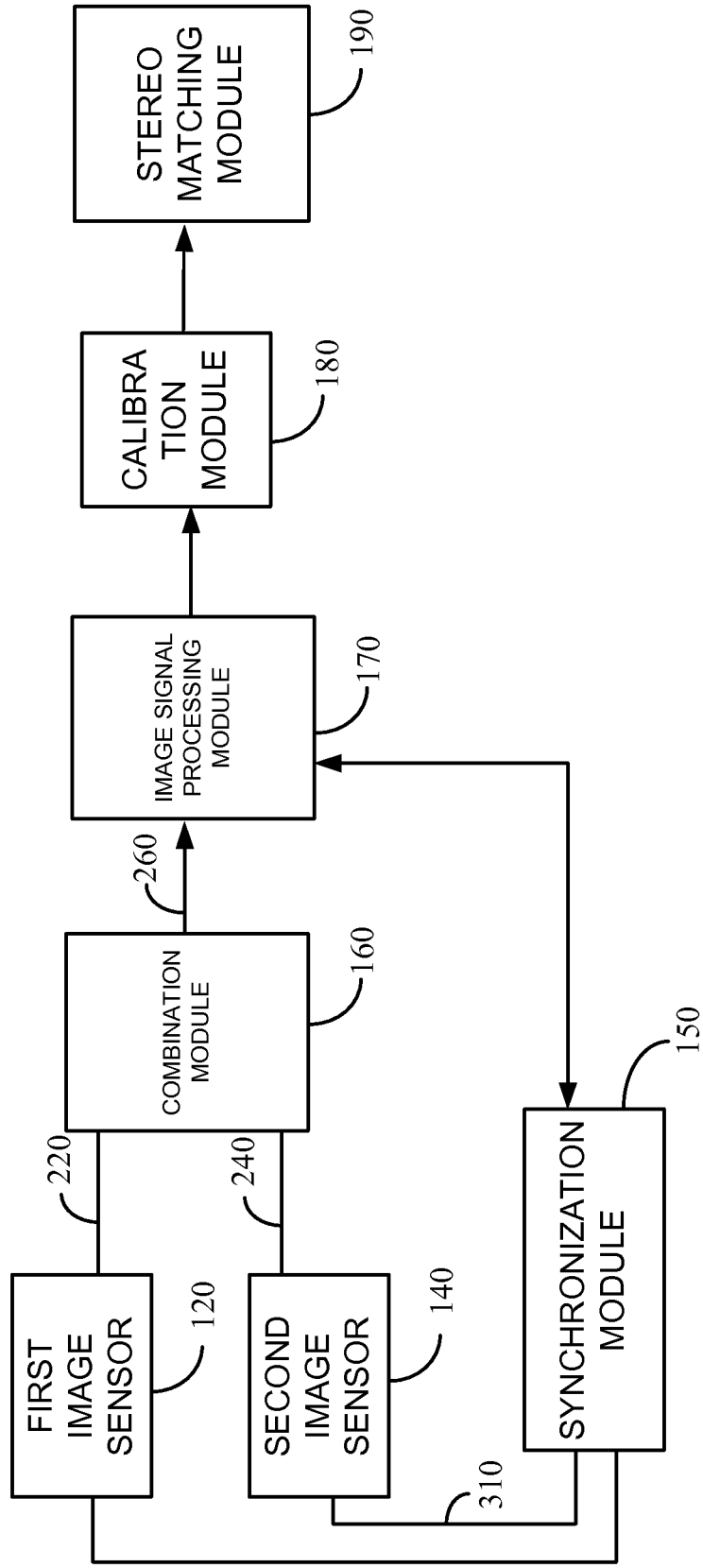
FIG. 1 is a functional block diagram illustrating a stereoscopic photography system according to one preferred embodiment of the present invention.

The present invention will now be described in detail with reference to a few preferred embodiments thereof as illustrated in the accompanying drawings. The same reference numerals refer to the same parts or like parts throughout the various figures.

FIG. 1 is a functional block diagram illustrating a stereoscopic photography system according to one preferred embodiment of the present invention. The stereoscopic photography system 10 of the embodiment includes a first image sensor 120, a second image sensor 140, a synchronization module 150, a combination module 160, an image signal processing module 170, a calibration module 180, and a stereo matching module 190.

Specifically, the first image sensor 120 is utilized to capture a first image for generating a first data stream 220. The second image sensor 140 is disposed apart from the first image sensor 120 by a horizontal distance and is utilized to capture a second image for generating a second data stream 240. Preferably, the horizontal distance is between 4 and 8 centimeters. Specifically, the first image sensor 120 can be a left camera for capturing a left image; the second image sensor 140 can be a right camera for capturing a right image. Furthermore, the first image sensor 120 and the second image sensor 140 of the embodiment are implemented by two RGB cameras, such as CMOS or CCD cameras, and the two RGB cameras have the same or similar properties (e.g., resolution). However, the present invention is not restricted thereto.

The first image sensor 120 and second image sensor 140 preferably are disposed on a circuit board (not shown). The synchronization module 150, the combination module 160, and the image signal processing module 170 can be configured on the circuit board. The above-mentioned synchronization module 150, the combination module 160 and the image signal processing module 170 can respectively be a chip, or they can be integrated into a System-on-a-Chip (SoC) for reducing the size and cost thereof.

Figure 2:
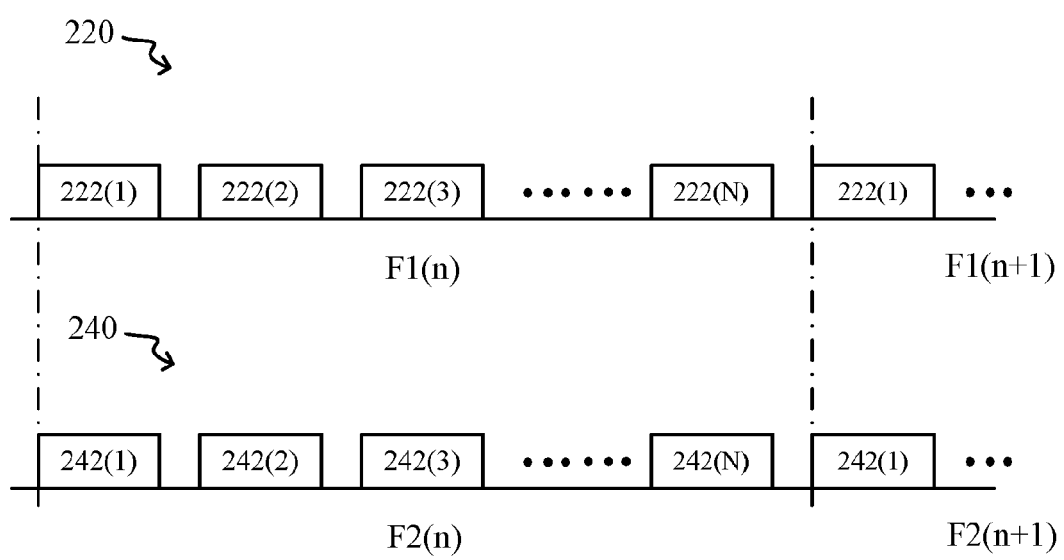
FIG. 2 is a timing chart schematically illustrating a first data stream and a second data stream.

Referring to FIG. 1 and FIG. 2, FIG. 2 is a timing chart schematically illustrating the first data stream 220 and the second data stream 240. The synchronization module 150 is electrically coupled to the first image sensor 120 and the second image sensor 140, and it is utilized to synchronize the first data stream 220 and the second data stream 240. As shown in FIG. 2, the first data stream 220 has a plurality of data line signals 222(1)~222(N). Each of the data line signals 222 includes the amount of information in each of the data lines, and these data lines form the data of a frame of the first image captured by the first image sensor 120. Similarly, the second data stream 240 has a plurality of data line signals 242(1)~242(N). Each of the data line signals 242 includes the amount of information in each of the data lines, and these data lines form the data of the frame of the second image captured by the second image sensor 140.

The synchronization module 150 provides a clock controlling signal 310 for the first image sensor 120 and the second image sensor 140 to control the timing sequences of the first data stream 220 and the second data stream 240 such that the first data stream 220 and the second data stream 240 have synchronized data line signals 222, 242 and a vertical sync signal (shown as dashed lines). The vertical sync signal means that the timing sequences of the first data stream 220 output a first frame F1 and the second data stream 240 output a second frame F2 are synchronous.

On the other hand, the synchronization module 150 is capable of communicating with the image signal processing module 170 for synchronizing auto-exposure and auto-white balance parameters of the first image sensor 120 and the second image sensor 140. Accordingly, the brightness and color of the first image and the second image simultaneously captured by both the first image sensor 120 and the second image sensor 140 are the same, in order to facilitate subsequent image processes.

Figure 3:
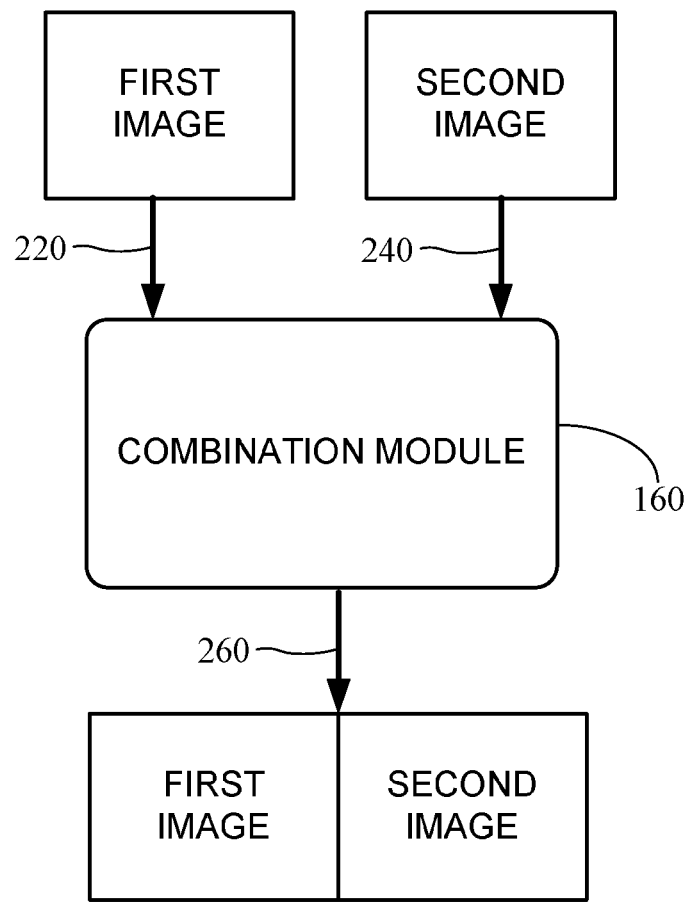
FIG. 3 is a schematic drawing illustrating operation of a combination module.

Referring to FIG. 1 and FIG. 3, FIG. 3 is a schematic drawing illustrating the operation of the combination module. The combination module 160 is utilized to combine the first data stream 220 and the second data stream 240 for outputting a combined image data 260. The combined image data 260 includes the first image and the second image. Preferably, the area of the frame that is composed of the combined image data 260 is twice the area of the frame of the first image or the second image.

Subsequently, as shown in FIG. 1, the combined image data 260 is sent to the image signal processing module 170 for image processing (such as color processing) and then is provided for the calibration module 180. More specifically, the combination module 160 combines the first data stream 220 and the second data stream 240 of the first image sensor 120 and the second image sensor 140, so just one Image Signal Processor (ISP) needs to be employed in the processing.

As shown in FIG. 1, the calibration module 180 is electrically coupled to the image signal processing module 170. The calibration module 180 is utilized to perform an image calibration and a horizontal rectification for the first image and the second image in the combined image data 260. Image calibration herein is used for correcting the distortion of the first image and the second image or the distortion caused by lenses. For example, it is capable of adjustment according to factory parameters of the lenses. Besides, the horizontal rectification is used for aligning the levels of the first image and the second image, so that the object captured by both can be located at the same height (i.e., Y coordinate) on the first image and the second image.

Figure 4:
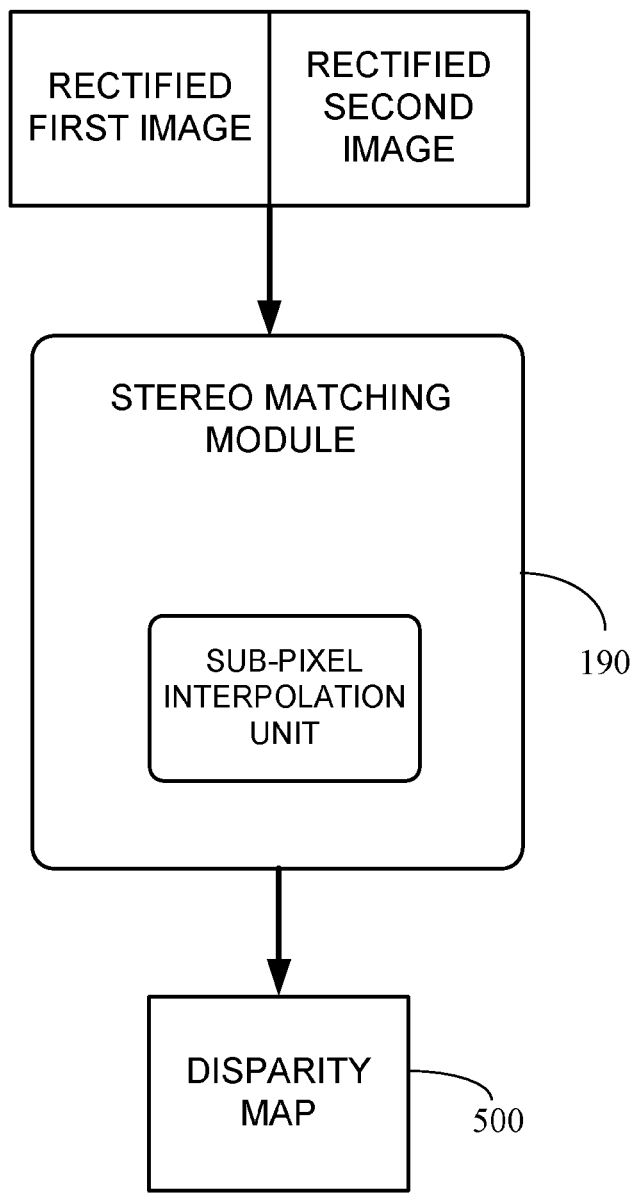
FIG. 4 is a schematic drawing illustrating operation of a stereo matching module.
Figure 5:
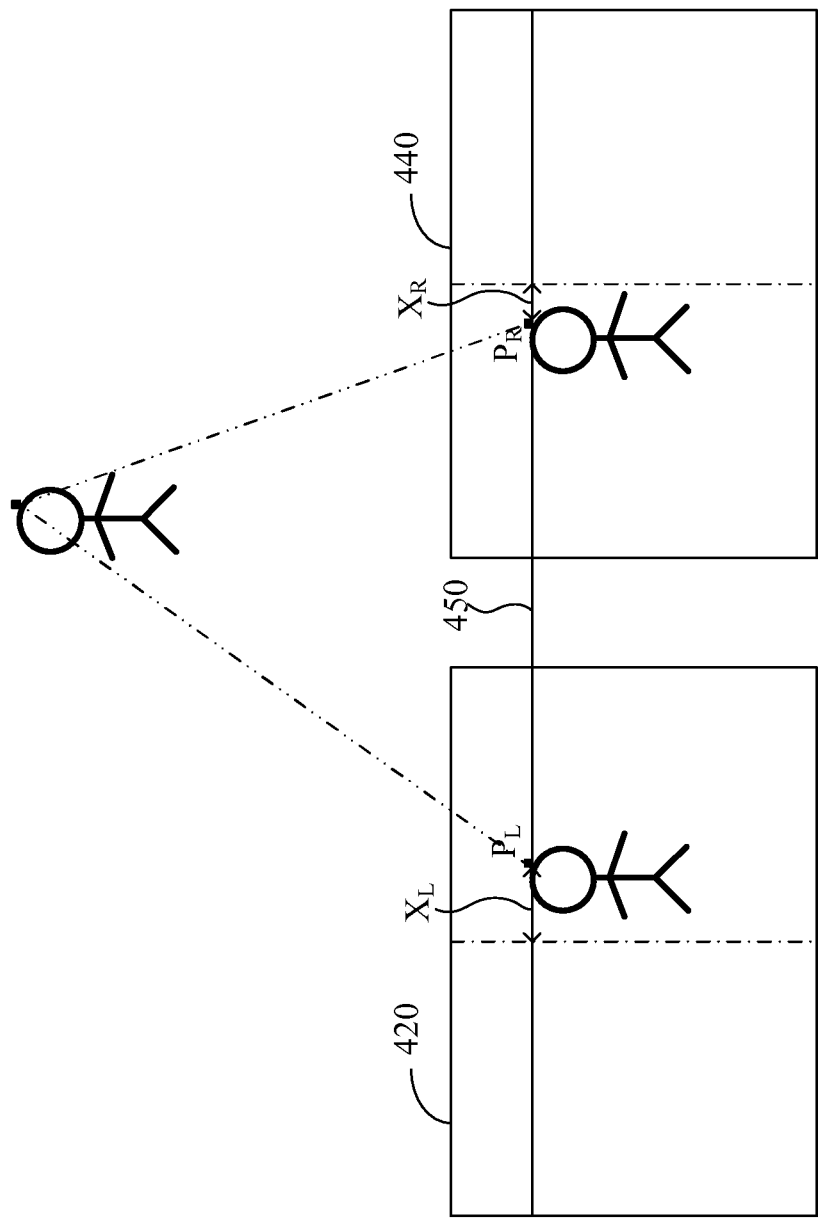
FIG. 5 is a schematic drawing illustrating a first image and a second image.

Referring to FIG. 4 and FIG. 5, FIG. 4 is a schematic drawing illustrating the operation of the stereo matching module; FIG. 5 is a schematic drawing illustrating the first image and the second image. The stereo matching module 190 is utilized to compute a disparity map 500 of a first image 420 relative to a second image 440. Specifically, referring to FIG. 5, the stereo matching module 190 computes a distance difference (i.e., disparity) between a reference pixel $P_L$ in the first image 420 and a corresponding pixel $P_R$ in the second image. The corresponding pixel $P_R$ herein represents the pixel indicating the position of the object, which is represented by the reference pixel $P_L$ on the first image 420, on the second image 440. Moreover, since the horizontal rectification has been performed on the first image 420 relative to the second image 440, the reference pixel $P_L$ and the corresponding pixel $P_R$ are located at the same horizontal line of the first image 420 and the second image 440, and the horizontal line is also known as an epipolar line 450. It can be seen from the foregoing that the distance difference is also a horizontal distance difference, that is, the difference between a coordinate $X_L$ of the reference pixel $P_L$ on the first image 420 and a coordinate $X_R$ of the corresponding pixel $P_R$ on the second image 440. In these coordinates, the centers (dashed line) of the first image sensor 120 and second image sensor 140 serve as the origins, positive direction toward the right and negative direction toward left. Therefore, the distance difference (disparity) is $X_R$-$X_L$.

Figure 6:
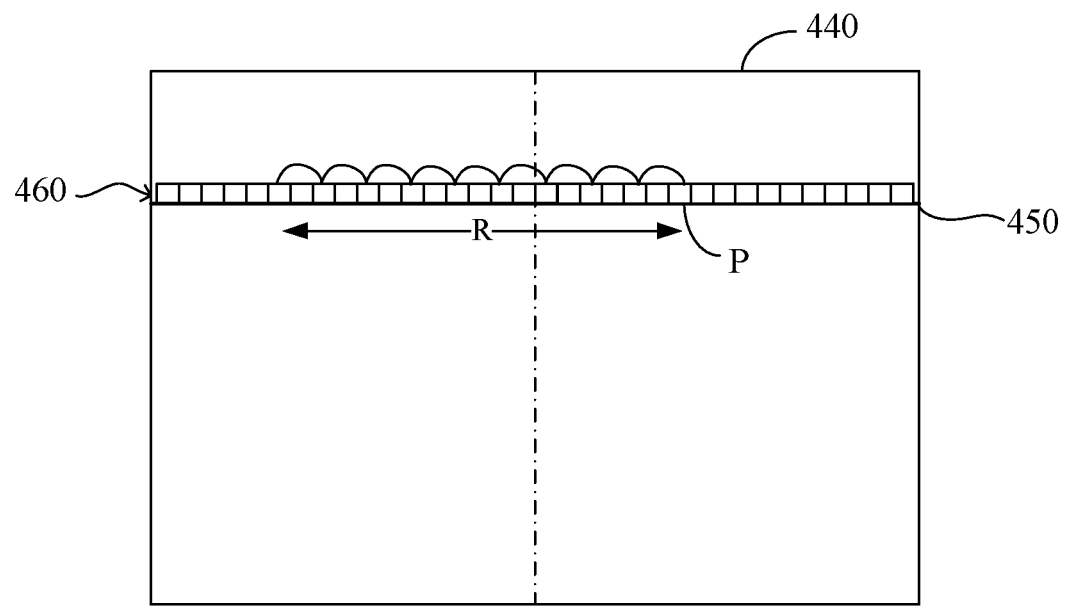
FIG. 6 is a schematic drawing illustrating computation of a distance difference.

The method for computing the distance difference will be discussed in detail in the following sections. Referring to FIG. 6, FIG. 6 is a schematic drawing illustrating the computation of the distance difference. Computing the distance difference by the stereo matching module 190 further includes comparing costs of a plurality of pixels relative to the reference pixel $P_L$ in a pixel row 460 (epipolar line 450) of the second image 440 in an interval manner. Specifically, the costs represent correlations between the pixels P and the reference pixel $P_L$. For example, the correlations are brightness differences or color differences between the pixels P and the reference pixel $P_L$. On the other hand, the interval manner is an interval of a predetermined number of the pixels P, in which the predetermined number is a positive integer. For example, if the predetermined number is 1, the amount of computation can be reduced in the interval of one pixel P, as shown in FIG. 6. It is understandable that the amount of computations can be halved when the predetermined number is 1.

However, the present invention is not limited thereto. For example, the predetermined number can be 2, 3, 4, 5, or other positive integers. Besides, every time the interval may not be a fixed value. It is worth mentioning that the computation for the selected pixels P on the entire pixel row 460 doesn't need to be carried out. It is only necessary to perform the comparison in the interval manner within a search interval R beginning at the coordinate $X_L$ of the reference pixel $P_L$ on the first image 420, thereby further reducing the amount of computations.

Figure 7:
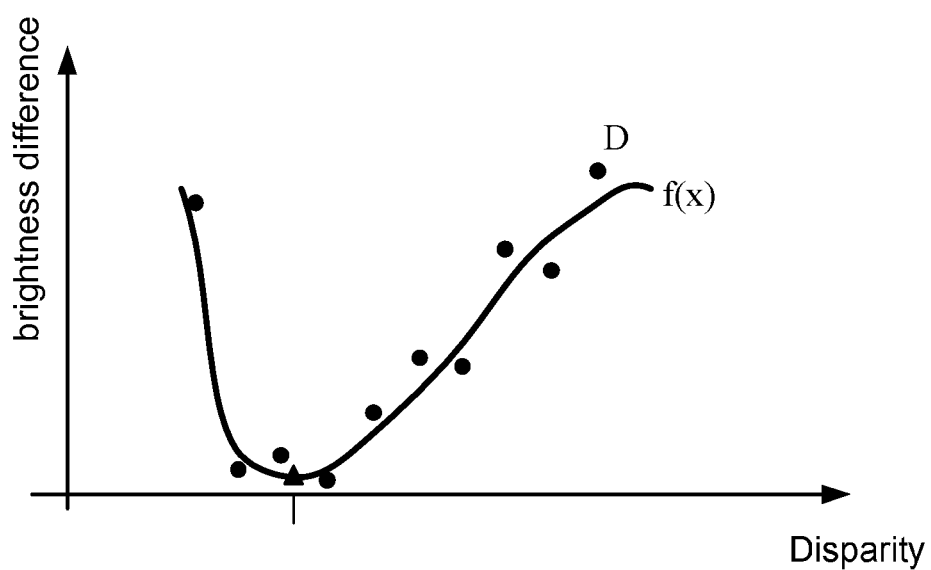
FIG. 7 depicts a schematic drawing illustrating a cost function according to the embodiment of the present invention.

FIG. 7 depicts a schematic drawing illustrating a cost function according to the embodiment of the present invention, where the horizontal axis represents the brightness difference, and the vertical axis represents the disparity (measured in pixels). After the count in the interval manner by the interval of one pixel P as shown in FIG. 6, a plurality of data points D can be obtained. As shown in FIG. 4, the stereo matching module 190 further includes a sub-pixel interpolation unit 195. The sub-pixel interpolation unit is utilized to accurately compute the distance differences. Specifically, by these data points D, the stereo matching module 190 can obtain a cost function f (x) through a mathematical operation, as shown in FIG. 7. The sub-pixel interpolation unit 195 can interpolate the cost function f (x) to obtain the lowest point (triangles) of the cost function f (x), and thus obtain an accurate disparity so that an error of the distance differences is less than 0.1 pixels. That is to say, the distance difference calculated by the sub-pixel interpolation unit 195 can have a higher resolution, thereby improving the matching accuracy.

After the stereo matching module 190 calculates the disparity of each pixel P, the disparity map 500 can be acquired. Accordingly, the depth of objects is inversely proportional to the disparity and is proportional to the product of a focal length and a horizontal distance between the second image sensor 140 and the first image sensor 120. Therefore, the depth of objects can be derived from the disparity map 500.

It is worth mentioning that the stereo matching module 190 is implemented by software, hardware, firmware, or a combination thereof. Preferably, the calibration module 180 and the stereo matching module 190 can be implemented by software. Moreover, the synchronization module 150, the combination module 160 and the image signal processing module 170 can be implemented by a microprocessor, one or more application-specific integrated circuit (ASIC), one or more field-programmable gate array (FPGA), or any combination thereof.

Figure 8:
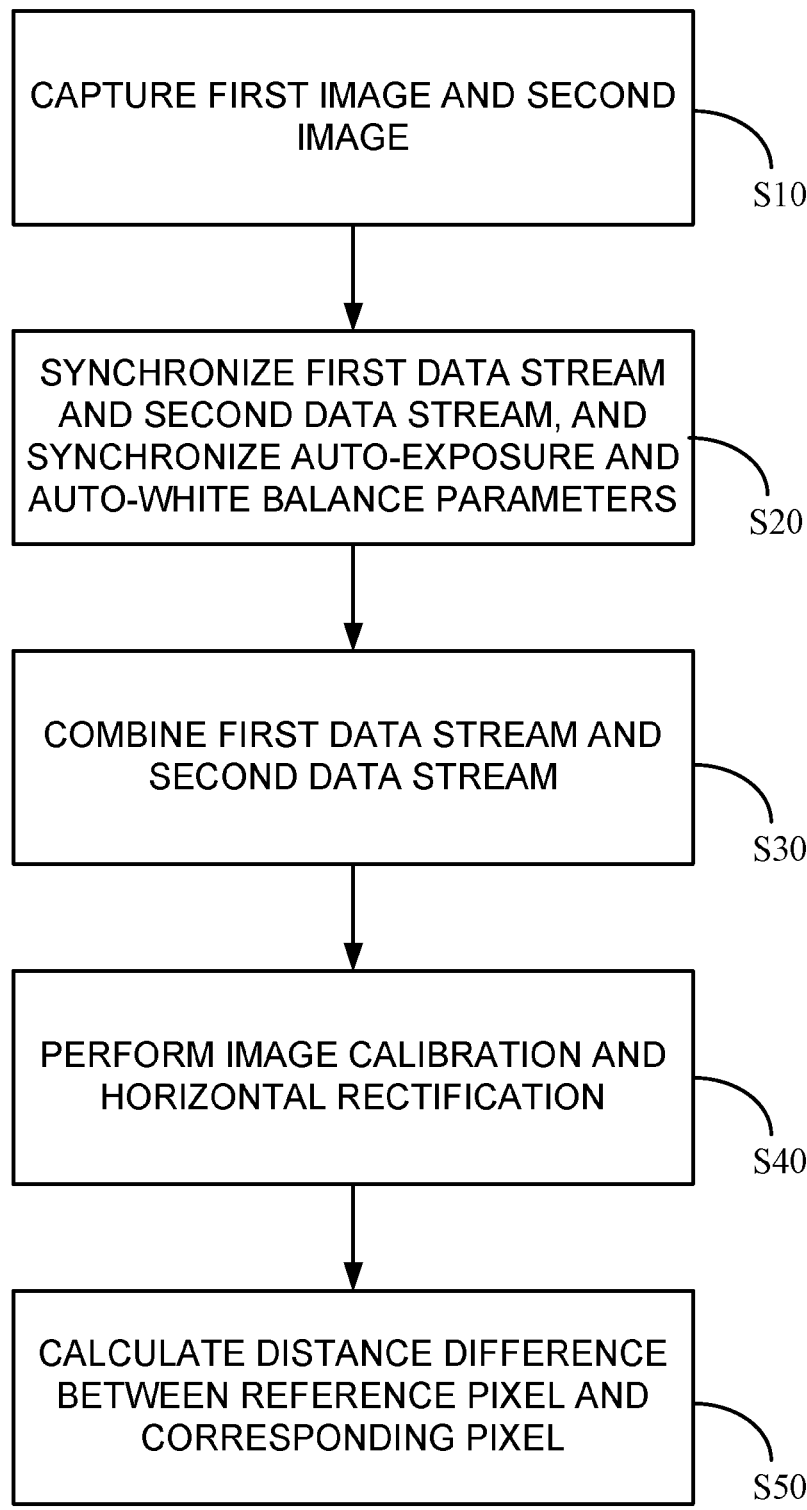
FIG. 8 is a flow chart illustrating a method for performing stereoscopic photography according to one preferred embodiment of the present invention.

A stereoscopic photography method of the stereoscopic photography system 10 of the embodiment will be explained in the following sections. Referring to FIG. 1 and FIG. 8, FIG. 8 is a flow chart illustrating a method for performing stereoscopic photography according to one preferred embodiment of the present invention. The method for performing the stereoscopic photography according to the embodiment is used for the above-mentioned stereoscopic photography system 10, and the descriptions of the following elements have been explained above, so it is not necessary to go into detail herein.

The method for performing the stereoscopic photography according to the embodiment begins with step S10. In step S10, the first image sensor 120 and the second image sensor 140 respectively capture a first image and a second image for generating a first data stream 220 and a second data stream 240, and then execution resumes at step S20.

In step S20, the synchronization module 150 synchronizes the first data stream 220 and the second data stream 240 and synchronizes auto-exposure and auto-white balance parameters of the first image sensor 120 and the second image sensor 140, and then execution resumes in step S30.

In step S30, the combination module 160 combines the first data stream 220 and the second data stream 240 for outputting a combined image data 260, and then execution resumes in step S40. The combined image data 260 includes the first image and the second image.

In step S40, the calibration module 180 performs an image calibration and a horizontal rectification for the first image and the second image in the combined image data 260, and then execution resumes in step S50.

In step S50, the stereo matching module calculates a distance difference between a reference pixel $P_L$ of the first image 420 and a corresponding pixel $P_R$ of the second image 440. The step of calculating the distance difference further includes comparing costs of a plurality of pixels P relative to the reference pixel $P_L$ in a pixel row 460 of the second image 440 in an interval manner. It is worth mentioning that the interval manner is an interval of a predetermined number of the pixels P. Specifically, the predetermined number is a positive integer.

Specifically, calculating the distance difference in step S50 specifically includes the step of performing a sub-pixel interpolation for accurately computing the distance difference, so that an error of the distance differences is lower than 0.1 pixels. Similarly, calculating the distance difference in step S50 is implemented by software, hardware, firmware, or a combination thereof.

Similarly, the stereo matching method of the stereoscopic photography system 10 of the embodiment will be explained in detail below. Referring to FIG. 1 and FIG. 5, the stereoscopic photography system 10 includes a first image sensor 120 for capturing a first image and a second image sensor 140 for capturing a second image. The stereo matching method includes calculating a distance difference between a reference pixel $P_L$ of the first image 420 and a corresponding pixel $P_R$ of the second image 440. The step of calculating the distance difference further includes comparing costs of a plurality of pixels P relative to the reference pixel $P_L$ in a pixel row 460 of the second image 440 in an interval manner. More specifically, the interval manner is an interval of a predetermined number of pixels, and the predetermined number is a positive integer.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disk read-only memory (CD-ROM), or any other form of storage medium known in the art.

In summary, the stereo matching module 190 employed in the present invention not only decreases the amount of disparity computations in the interval manner but also improves the accuracy of calculating the 3D depths by means of the sub-pixel interpolation. That is to say, the stereoscopic photography system and method of the present invention not only reduce the amount of computation by the interval manner, but also improve the accuracy of the 3D depths due to the sub-pixel interpolation.

While the preferred embodiments of the present invention have been illustrated and described in detail, various modifications and alterations can be made by persons skilled in this art. The embodiment of the present invention is therefore described in an illustrative but not restrictive sense.

What is claimed is:

1. A stereoscopic photography system, comprising:
   a first image sensor utilized to capture a first image for generating a first data stream;
   a second image sensor disposed apart from the first image sensor by a horizontal distance, utilized to capture a second image for generating a second data stream;
   a synchronization module electrically coupled to the first image sensor and second image sensor, utilized to synchronize the first data stream and the second data stream and utilized to synchronize auto-exposure and auto-white balance parameters of the first image sensor and the second image sensor;
   a combination module utilized to combine the first data stream and the second data stream for outputting a combined image data which comprises the first image and the second image;
   a calibration module utilized to perform an image calibration and a horizontal rectification for the first image and the second image in the combined image data; and
   a stereo matching module comprising a sub-pixel interpolation unit which is utilized to calculate a distance difference between a reference pixel of the first image and a corresponding pixel of the second image, wherein the stereo matching module compares costs of a plurality of pixels relative to the reference pixel in a pixel row of the second image in an interval manner and an error of the distance differences is less than 0.1 pixels.

2. The stereoscopic photography system of claim 1, wherein the interval manner is an interval of a predetermined number of the pixels.

3. The stereoscopic photography system of claim 2, wherein the predetermined number is a positive integer.

4. The stereoscopic photography system of claim 1, wherein the costs are brightness differences.

5. The stereoscopic photography system of claim 1, wherein the pixels are positioned in a search interval of the pixel row.

6. The stereoscopic photography system of claim 1, wherein the synchronization module provides a clock controlling signal for the first image sensor and the second image sensor.

7. The stereoscopic photography system of claim 6, wherein the first data stream and the second data stream have synchronized data line signals.

8. The stereoscopic photography system of claim 1, wherein the stereo matching module is implemented by software, hardware, firmware, or a combination thereof.

9. A method for performing stereoscopic photography, comprising the steps of:
- capturing a first image and a second image respectively by a first image sensor and a second image sensor for generating a first data stream and a second data stream;
- synchronizing the first data stream and the second data stream, and synchronizing auto-exposure and auto-white balance parameters of the first image sensor and the second image sensor;
- combining the first data stream and the second data stream for outputting a combined image data which comprises the first image and the second image;
- performing an image calibration and a horizontal rectification for the first image and the second image in the combined image data; and
- calculating a distance difference between a reference pixel of the first image and a corresponding pixel of the second image, wherein calculating the distance difference further comprises the step of performing a sub-pixel interpolation for computing the distance difference and the step of comparing costs of a plurality of pixels relative to the reference pixel in a pixel row of the second image in an interval manner;
- wherein an error of the distance differences is less than 0.1 pixels.

10. The method of claim 9, wherein the interval manner is an interval of a predetermined number of the pixels.

11. The method of claim 10, wherein the predetermined number is a positive integer.

12. The method of claim 9, wherein the costs are brightness differences.

13. The method of claim 9, wherein the pixels are positioned in a search interval of the pixel row.

14. The method of claim 9, wherein the step of calculating the distance difference is implemented by software, hardware, firmware, or a combination thereof.

15. A stereo matching method of a stereoscopic photography system, the stereoscopic photography system comprising a first image sensor for capturing a first image and a second image sensor for capturing a second image, the method comprising:
- calculating a distance difference between a reference pixel of the first image and a corresponding pixel of the second image, wherein calculating the distance difference further comprises the step of performing a sub-pixel interpolation for computing the distance difference and the step of comparing costs of a plurality of pixels relative to the reference pixel in a pixel row of the second image in an interval manner;
- wherein an error of the distance differences is less than 0.1 pixels.

16. The stereo matching method of claim 15, wherein the interval manner is an interval of a predetermined number of the pixels, and the predetermined number is a positive integer.

* * * * *